US005691030A

United States Patent [19]

De Meyer

[11] Patent Number: 5,691,030
[45] Date of Patent: Nov. 25, 1997

[54] STABILIZED FABRICS AND REINFORCED PRODUCTS CONTAINING THEM

[75] Inventor: Willy De Meyer, Drongen, Belgium

[73] Assignee: Milliken Research Corporation, Spartanburg, S.C.

[21] Appl. No.: 515,867

[22] Filed: Aug. 16, 1995

Related U.S. Application Data

[63] Continuation of Ser. No. 335,196, Nov. 7, 1994, abandoned, which is a continuation of Ser. No. 114,906, Sep. 2, 1993, abandoned.

[30] Foreign Application Priority Data

May 14, 1993 [GB] United Kingdom ................... 9309951

[51] Int. Cl.$^6$ ............................ D03D 13/00; D03D 15/00
[52] U.S. Cl. .......................... 428/107; 428/109; 428/113; 428/114; 428/137; 442/4
[58] Field of Search ..................... 428/107, 109, 428/113, 114, 137; 442/4

[56] References Cited

U.S. PATENT DOCUMENTS 2,755,214  7/1956  Lyons et al. .
4,414,272  11/1983  Watanabe .

FOREIGN PATENT DOCUMENTS 0425099  5/1991  European Pat. Off. .

Primary Examiner—Kathleen Choi
Attorney, Agent, or Firm—Terry T. Moyer; Earle R. Marden

[57] ABSTRACT

A bonded fabric comprising a mesh of filament yarns of the core-sheath type having little or no elasticity in the longitudinal direction but which will break when bent without affecting the filaments in the core.

1 Claim, No Drawings

STABILIZED FABRICS AND REINFORCED PRODUCTS CONTAINING THEM

This application is a continuation of prior application Ser. No. 08/335,196, filed on Nov. 7, 1994, now abandoned, which is a Continuation of application Ser. No. 08/114,906, filed on Sep. 2, 1993, now abandoned, of Willy De Meyer for STABILIZED FABRICS AND REINFORCED PRODUCTS CONTAINING THEM.

FIELD OF THE INVENTION

This invention relates to textile fabrics of the type commonly used in industrial applications as a reinforcement of products including radiator, fuel filler and other hoses. The invention relates also to the reinforced products and to their manufacture.

BACKGROUND OF THE INVENTION

Most woven fabrics used in industrial textile applications have a load-bearing warp and weft and will therefore not distort if tensioned in either direction. However, some textile fabrics such as Atlas-stitch knitted fabrics are dimensionally less stable once they are released from the control mechanism of their production machines, and will easily distort when tensioned in the longitudinal or transverse direction. Such fabrics are sometimes preferred as reinforcing materials because they facilitate shaping during manufacture of a composite product, e.g. a radiator hose.

An automobile radiator coolant hose and a method for its production are disclosed in U.S. Pat. No. 4,242,296. It is apparently the case that the reinforcing fabric allows the hose material to be deformed to a limited extent only. The hose is produced by using a first extrusion head, for obtaining an inner hose portion onto which the reinforcing fabric is applied, and a second extrusion head for producing an outer hose portion on the fabric. When the second hose portion is applied, the fabric stretches. When the hose material is bent, the reinforcing fabric can be stretched only to a limited extent, so that the bending radius must be large.

EP-A-0100573 describes a method for shaping a hose of material including a reinforcing fabric, and curing the material in the desired shape. However, it appears that, when the hose is bent, the fabric will not stretch as much as might be desired and will therefore tear, whereupon the wall of the hose may also tear/burst at the outside of the bend. If the reinforcing fabric does not tear, the inner side of the bend will fold: the internal cross-section of the tube is therefore distorted, to give an oval cross-section at the bend.

If a conventional reinforcing fabric can be stretched in the longitudinal direction sufficiently to allow bending of the hose, the likely result is that the fabric will stretch during production of a hose, resulting in a change in fabric orientation. The fabric's tensile strength or width may thus be changed undesirably, e.g. by reducing or removing the overlap between the edges of a fabric defining an annulus in a green hose, thus affecting the properties of the product when shaped. In other words, the fabric will not have the desired degree of dimensional stability.

EP-A-0425099 corresponding to U.S. Pat. No. 5,229,056 describes a fabric which can withstand the forces applied to it when incorporated as a reinforcement in a composite product, which is stretched to a limited extent only during this procedure, but which allows the product to be bent into a desired shape, while retaining its reinforcing function. That fabric is stabilised by means, e.g. longitudinal filaments, which are breakable or otherwise capable of losing their stabilising effect. The reinforced product is produced from a fabric which is dimensionally-stable, and is then treated or otherwise handled to destroy the stabilising means in situ, and give the advantage of easy shaping. The fabric does not distort during slitting and incorporation into a matrix, while the reinforced product can be shaped without deformation, e.g. buckling or tearing.

Various materials are suggested in EP-A-0425099, for constructing the fabric and stabilising filaments. Various mesh fabrics that are woven or knitted are described, although one suggestion is that for an aramid material, which is less suitable to be looped, the fabric may comprise a bonded mesh of linear filaments and, if desired, stabilising carrier threads that are stitched in. It has been found, however, that the mere bonding of filaments may not overcome the problem of distortion described above. Further, the looping of filaments means that the reinforced products may be sufficiently thick that, in order that the matrix covers the entire fabric, the use of silicone rubber or other expensive matrix materials is uneconomic despite their other advantages.

SUMMARY OF THE INVENTION

According to the present invention, a bonded fabric comprises a mesh of filaments of the core-sheath type bonded together at the crossing point of the filaments, the fabric having substantially no elasticity in the longitudinal direction under first conditions, but whose bonding is capable of breaking or yielding under second conditions without affecting the relatively strong filament cores. This fabric has essentially the same reinforcing function as that described in EP-A-0425099 and comprising stabilising longitudinal filaments. In accordance with the present invention, the filaments are usually linear and any longitudinal filaments are relatively thin. In consequence, the thickness of the fabric is largely determined by the thickness of the mesh filaments. A further advantage of the novel mesh fabric is that it can be conveniently produced, e.g. with longitudinal filaments providing plain selvedges, on a tape machine.

DETAILED DESCRIPTION OF THE INVENTION

The mesh filaments are not restricted by their tendency to undergo abrasion if looped. Suitable core materials can therefore have a very high tensile strength, examples being polyamide, silica, polyester, aramid, glass and carbon fibres. The core often has a specific gravity of at least 1, e.g. 1.2 to 1.5, g/cm$^3$ (1.38 for polyester).

The sheath material and any longitudinal filament or carrier thread may be a filamentary material of relatively low but sufficient strength to carry the fabric through slitting and the production of, say, a green hose, without distortion. When the stabilised fabric is incorporated into a composite product that requires shaping, e.g. a radiator coolant hose, the bonding or stabilising effect is capable of breaking or passing its yield point, if appropriate on heating, thus enabling the shaping action to take place. A suitable sheath material is of PVC or a polyacrylate.

One way in which the reinforcement may be produced is to spin, core-texture, envelope or twist around a yarn such as glass, aramid or carbon, another yarn or foil with a lower melting point than the main reinforcement yarn and to make a composite fabric by applying heat, pressure waves or other means so that the matrix yarn melts together with the surface of other laid-in ends. The binding can be sufficient so that a longitudinal carrier yarn may not be necessary. The heat/ pressure or other means will make the binding sufficient to get through the process while, by applying a higher force than used during the production process, if the e.g. green hose reinforcement fabric will allow the shaping as the connection points will yield. This technique can also be used to reduce the abrasion of yarns such as aramid, glass or carbon, and to increase the impact resistance and to increase the adhesion to the rubber. A typical yarn is a glass yarn with polyamide around or an aramid with e.g. polyamide around. The amount of matrix yarn around the reinforcement is usually 5% to 60%, preferably 15% to 40% by weight.

Adhesive-bonding of the mesh fabric may be particularly preferred when longitudinal filaments are present in the form of selvedge yarns. While such a yarn may be thinner than the mesh filaments, a primary object of a mesh that, at least in its central, crossing-point area, it is relatively thin (e.g. less than 1 mm) and easy to produce, can also be met if the selvedge yarn, of any suitable type, is thicker (in which case the fabric may have enhanced bursting strength). The selvedge may be glued, stitched or otherwise bound to the mesh fabric, but is preferably a normal plain selvedge.

A product of the invention may be made by generally known techniques, e.g. the separate extrusion of two layers of extrudable matrix material and the insertion therebetween of the reinforcing fabric. The product is preferably in the form of a tube or hose, but it will be apparent that the invention is equally applicable to the production of other products, such as cables, upholstery, boots or other footwear, roofing or tent reinforcement, and bicycle or other tires. In general, the invention is appropriate for use in cases where the product has to be bent through an arc or otherwise deformed into a desired shape. Shaping may be sufficient to provide a stable product: if necessary, curing or vulcanisation may follow.

By way of example, a hose of the invention may be produced by extruding material from first and second coaxial extrusion heads, and continuously supplying a strip of stabilised reinforcing fabric between the heads. The strip is applied so that its longitudinal edges are contiguous or overlapping, the strip being applied onto the inner layer of extruded material. The reinforcing fabric should preferably have a sufficiently open structure that the material or materials extruded through the coaxial heads can flow together through the fabric.

The stabilised reinforcing fabric has a modulus of elasticity which is relatively high, and thus a low degree of stretch, e.g. under tension up to a certain value. When the tension exceeds this value, the bonding means may break or deconstruct, or the modulus of elasticity may be relatively low, and the fabric can therefore be relatively easily stretched. Initially, the fabric will maintain its shape when a force is applied in the longitudinal direction of the hose. When the hose is bent, the fabric is under strain at the outside of the bend, such that the stabilising means will be destroyed or deconstructed, or become yielding, so that the fabric can be stretched together with the material of the hose. Neither the base fabric nor the wall of the hose tears. The cross-section and stability of the hose are maintained.

The low elasticity exists for the fabric per se, and is retained over a range of conditions including slitting and bonding to a curable rubber or plastics matrix. This effect is reduced or removed under different conditions, e.g. under tension, but without affecting the integrity of the mesh. Therefore, after application of these different conditions, the fabric essentially comprises only, or essentially only, the core filaments.

If the stabilising means is broken or otherwise deconstructed, or yields, under tension, the relative melting points of the core and sheath materials are not critical. However, if the bonding means is a material that is not breakable or yielding, its melting point should be lower than that of the mesh fabric.

In particular, the reinforcing fabric can be in the shape of a lay-in, knitted or braided fabric with an open structure and with meshes in the shape of a rhombus, parallelogram or other rectangle; opposing corner points of succeeding meshes lie on a line which, when the fabric is laid in the hose material, extends substantially parallel to the longitudinal direction of the hose, and may be connected by longitudinal threads. These threads effect their connecting function as long as this is necessary, especially during slitting the fabric and a green hose production process. In the case of a composite mesh fabric, the sheath functions to bond the fabric, rather than longitudinal filaments.

In general, it is preferred that the meshes are defined by sides making an angle of 40° to 80°, e.g. 40° to 70°, preferably 45° to 65°, e.g. about 55°, with the longitudinal direction of the fabric and of a hose or other product including the fabric.

For the purpose of illustration, reference may be made to FIGS. 1 and 2 of the drawings in EP-A-0425099 wherein a plurality of filaments are shown extending at an angle to other filaments of the fabric which as disclosed herein would be core-sheaf filaments. FIGS. 6 and 7 in that specification illustrate the theory underlying the utility of reinforced fabrics of the type described there and of this invention.

The following Examples illustrate the invention.

EXAMPLE 1

Firstly, for the purposes of comparison, a fabric was prepared as described in Example 1 of EP-A-0425099, but using 840 dtex aramid. The gauge of the fabric was 1.14 mm. Its weight was 168 g/m$^2$.

Using the same aramid fibres laid on top of one another, and held together by means of a longitudinal stitched-in nylon filament, the thickness of 0.33 mm and the weight 42 g/m$^2$. In another embodiment, using 1140 dtex aramid, the gauge was approximately 0.40 mm.

The tensile strength of the novel fabric, relative to the original aramid yarn strength, was 90–100%. The tensile strength of the comparative material on the same basis was 30–40%.

The fabrics of the invention can be used to reinforce a coolant hose, with satisfactory results, by the procedure described in Example 1 of EP-A-0425099.

EXAMPLE 2

A product of the invention comparable to that of Example 1 was prepared, but instead of using nylon threads, the mesh was produced on a tape machine and stabilised by longitudinal filaments (or bands) providing plain selvedges. The reinforcing yarn ends were of heat-resistant polyamide 66, with low elongation, in order to withstand coolant fluid better. The mesh angle was below 55°, in order to minimise hose swelling.

I claim:

1. A fabric designed for the formation of formed products comprising: a first plurality of core-sheath filaments extending in one direction, a second plurality of core-sheath filaments meshed with said first plurality of core-sheath filaments and extending at an angle to said first plurality of core-sheath filaments, said first plurality of core-sheath filament being adhered to said second plurality of core-sheath filaments to hold them in fixed relation to one another such adherence being capable of breaking or yielding under pressure without breaking the core filaments of the core-sheath filaments in said fabric, said core-sheath filaments of said first plurality are adhered to said plurality of second core-sheath filaments at the cross-over points of said filaments, said fabric including a plurality of longitudinally extending filaments sewn, tufted, stretched, bonded or knit around the cross-over points of said core-sheath filaments wherein a portion of said longitudinal extending filaments form a selvage for said fabric and said fabric is less than 1 mm thick.

* * * * *

UNITED STATES PATENT AND TRADEMARK OFFICE
CERTIFICATE OF CORRECTION

PATENT NO.  : 5,691,030
DATED       : November 25, 1997
INVENTOR(S) : DeMeyer, Willy It is certified that error appears in the above-identified patent and that said Letters Patent is hereby corrected as shown below:

Column 6, line 3 - delete "tho" insert "the"

Signed and Sealed this

Seventeenth Day of March, 1998

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,691,030
DATED : November 25, 1997
INVENTOR(S) : DeMeyer, Willy

It is certified that error appears in the above-indentified patent and that said Letters Patent is hereby corrected as shown below:

On title page, item [45] insert an asterisk is inserted before the patent date.

"Notice:     On title page, following the assignee data, insert: Under 35 U.S.C. 154, the term of this patent shall be extended for 192 days."

Signed and Sealed this

First Day of December, 1998

Attest:

BRUCE LEHMAN

Attesting Officer      Commissioner of Patents and Trademarks